United States Patent
Strothmann

(10) Patent No.: US 6,598,490 B2
(45) Date of Patent: Jul. 29, 2003

(54) APPARATUS FOR CONTACT-LESS MEASURING THE VALUE OF A DIFFERENCE ANGLE BETWEEN TWO PARTS ROTATING ABOUT A COMMON AXIS

(76) Inventor: Thomas Strothmann, Noldestr., D-49134 Wallenhorst (DE)

( * ) Notice: Subject to any disclaimer, the term of this patent is extended or adjusted under 35 U.S.C. 154(b) by 0 days.

(21) Appl. No.: 10/174,300

(22) Filed: Jun. 17, 2002

(65) Prior Publication Data

US 2002/0152821 A1 Oct. 24, 2002

Related U.S. Application Data

(63) Continuation of application No. PCT/EP00/13000, filed on Dec. 20, 2000.

(30) Foreign Application Priority Data

Dec. 20, 1999 (DE) .......................... 199 61 884

(51) Int. Cl.[7] .............................. G01L 3/10; G01B 7/30; G01D 5/12; B62D 5/00
(52) U.S. Cl. .............................. 73/862.331; 324/207.2; 324/207.25
(58) Field of Search ................... 324/207.2–207.23, 324/207.25, 174; 73/862.331, 514.16, 514.31; 310/68 B; 180/443

(56) References Cited

U.S. PATENT DOCUMENTS

| 4,724,710 A | 2/1988 | Murty ..................... 73/862.33 |
| 4,784,002 A | 11/1988 | Io ........................... 73/862.33 |
| 4,897,603 A | * 1/1990 | Bieber et al. ............ 324/207.2 |
| 4,899,075 A | * 2/1990 | Hasebe ................ 310/68 B X |
| 4,984,474 A | 1/1991 | Matsushima et al. .... 73/862.33 |
| 5,528,139 A | * 6/1996 | Oudet et al. ............. 324/207.2 |
| 5,625,239 A | * 4/1997 | Persson et al. .......... 310/68 B |

FOREIGN PATENT DOCUMENTS

| DE | 29 42 873 A1 | 4/1981 |
| DE | 197 47 638 C1 | 7/1999 |
| DE | 198 16 568 A1 | 11/1999 |
| EP | 89300512.4 | 1/1989 |

* cited by examiner

Primary Examiner—Gerard R. Strecker
(74) Attorney, Agent, or Firm—Thomas, Kayden, Horstemeyer & Risley

(57) ABSTRACT

An apparatus for contact-less measuring a difference angle between two parts rotating about a common axis comprises an annular shaped stator having magnetic pole pairs on an inner circumference, and a cylindrically shaped ferromagnetic rotor having pole ends for magnetically scanning the pole pairs of the stator. There are a first air gap between the pole pairs of the stator and the pole ends of the rotor; and an accessible and rotationally symmetric second air gap between the inner circumference of the stator and the rotor. The magnetic flux across the second air gap is changed according to the difference angle between the rotor and the stator. This is determined by a magnetically sensitive element which is arranged at a fixed position within the second air gap.

17 Claims, 7 Drawing Sheets

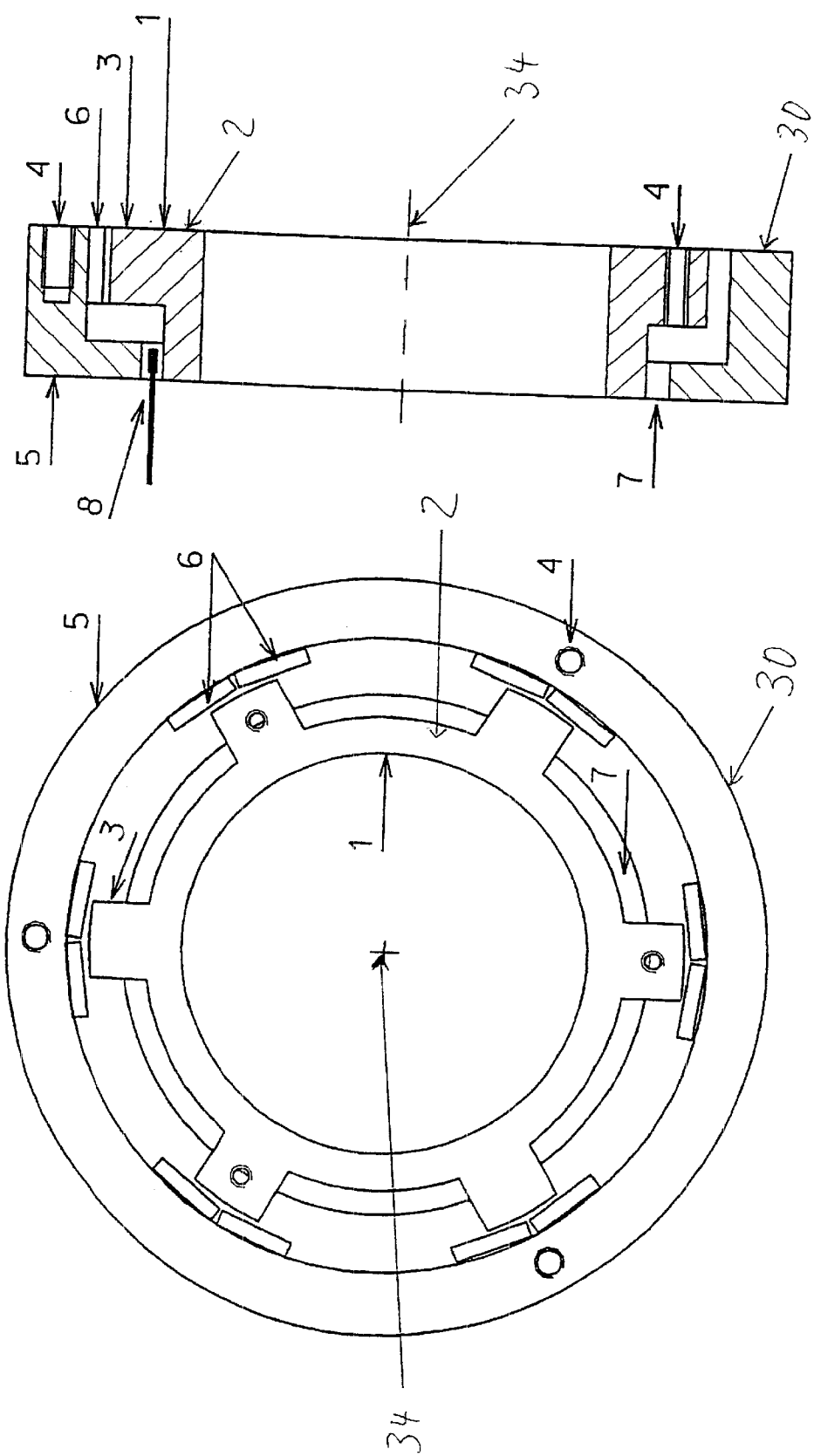

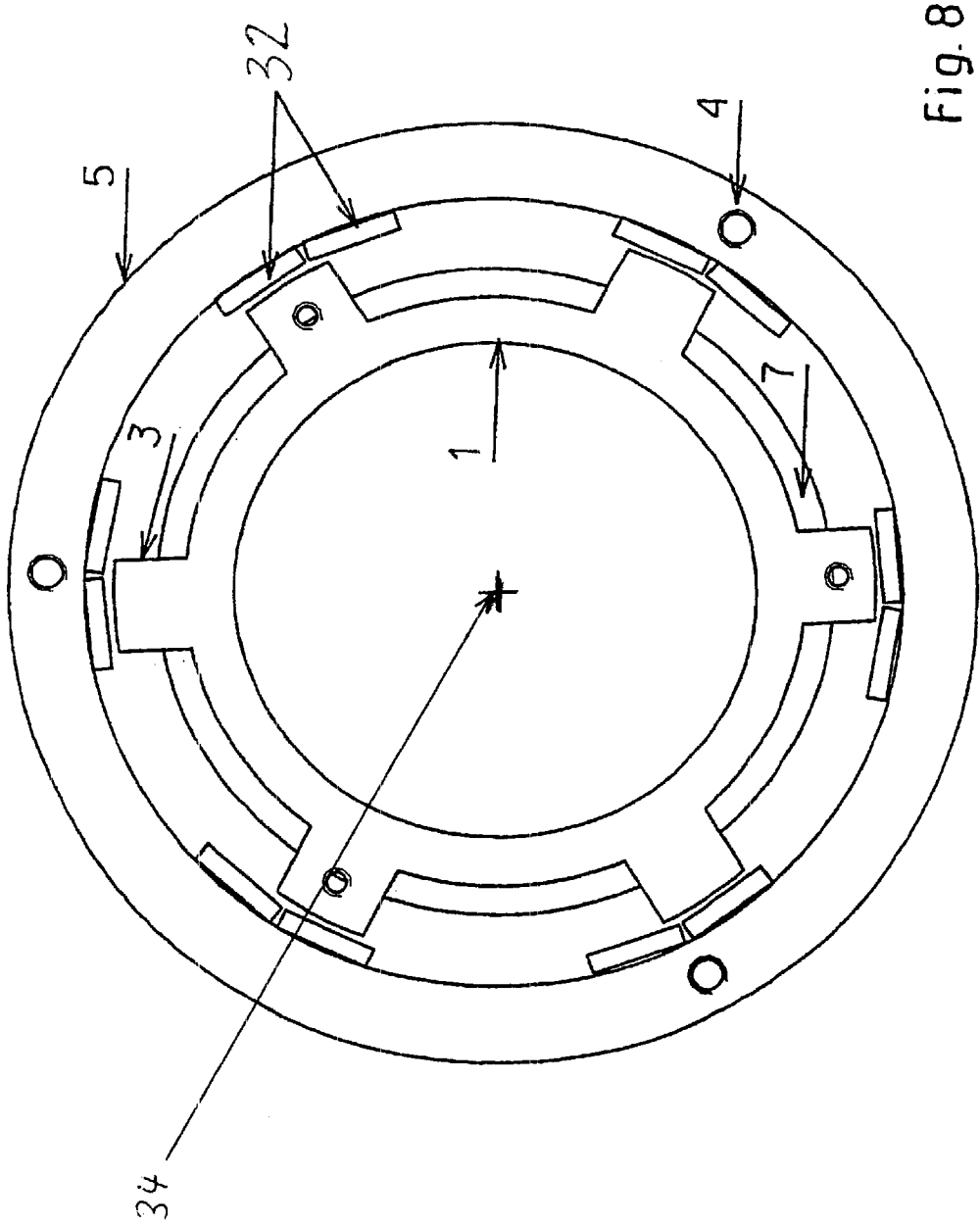

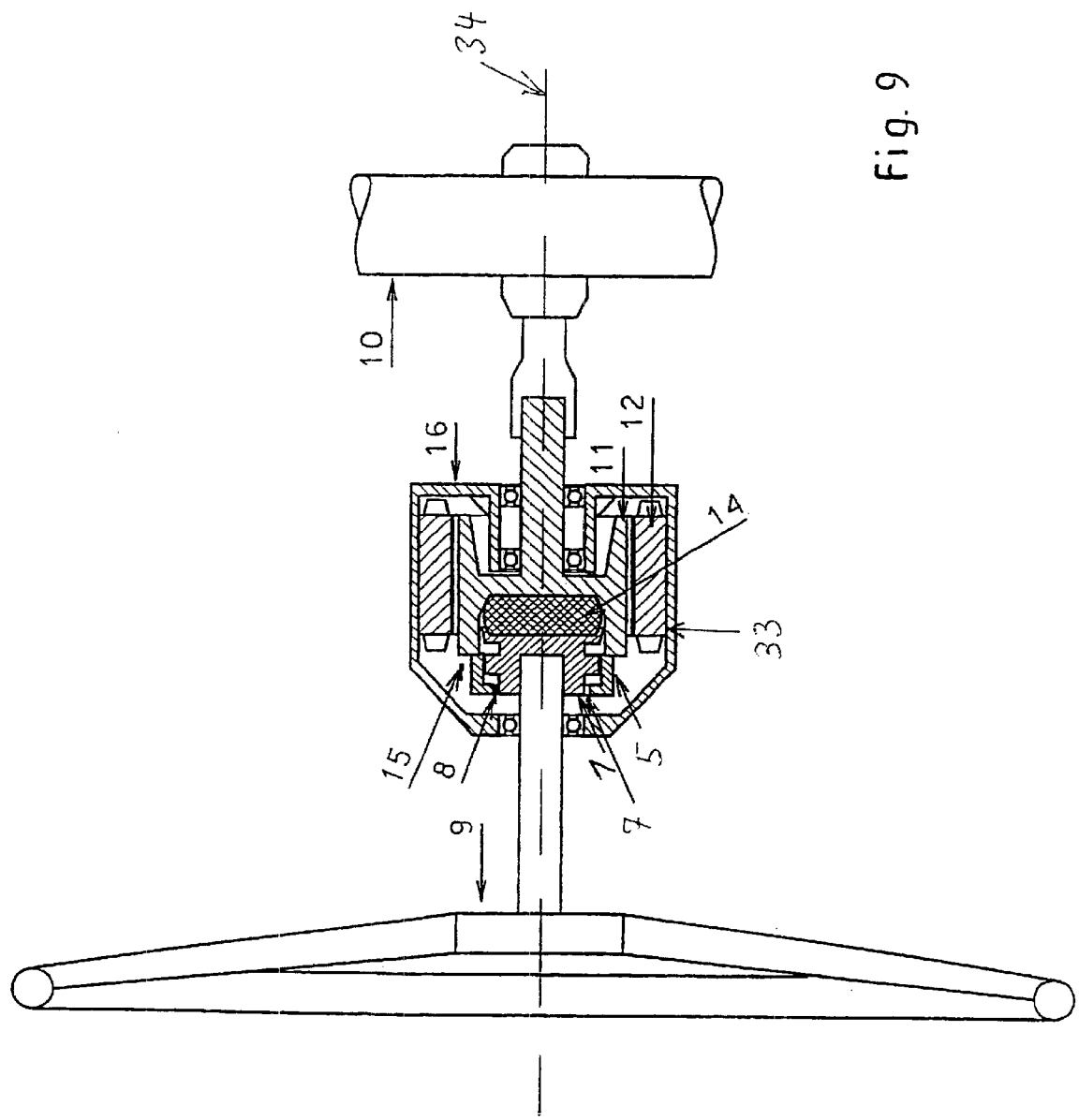

US 6,598,490 B2

APPARATUS FOR CONTACT-LESS MEASURING THE VALUE OF A DIFFERENCE ANGLE BETWEEN TWO PARTS ROTATING ABOUT A COMMON AXIS

CROSS REFERENCE TO RELATED APPLICATIONS

This application is a continuation of International Application PCT/EP00/13000 with an International Filing Date of Dec. 20, 2000 and claiming the benefit of co-pending German Patent Application No. 199 61 884.4 entitled "Anordnung zur kontaktlosen Erfassung von Drehwinkeln, Drehmomenten und sonstigen, vorzugsweise rotatorischen Größen zwischen rotirenden Teilen", filed on Dec. 20, 1999.

FIELD OF THE INVENTION

The invention relates to an apparatus for contact-less measuring the value of a difference angle between two parts rotating about a common axis.

BACKGROUND OF THE INVENTION

It is possible to reduce the task of detecting rotational variables between two rotating parts, like, for example torque, angle of rotation, rotational speed or rotational acceleration, to a measurement of the difference angle between these two parts. If a torque is to be measured, e.g. between a power take-in shaft and a power take-off shaft, a counter torsion force with a defined spring characteristic has to be provided between the two parts for transforming the torque into a corresponding difference angle. This can be affected by a spring or torsion element acting between the two parts.

U.S. Pat. No. 4,784,002 discloses a torque sensor measuring a torsion between two shafts rotating about a common axis and connected to each other via a torsion element. A stator connected to one of the shafts comprises permanent magnets each forming one magnetic pole, the magnetic poles being arranged at equal intervals and with alternating axial magnetization in the direction of rotation about the common axis. A rotor connected to the other shaft has two separate rotor parts each forming a set of pole ends for magnetically scanning the permanent magnets of the stator. All pole ends are arranged at equal intervals in the direction of rotation about the common axis, each pole end of the one rotor part being arranged between two pole ends of the other rotor part. The total number of pole ends of the rotor is equal to the total number of magnetic poles of the stator. An axial first air gap is formed between the permanent magnets of the stator and the pole ends of the rotor. Further, a rotationally symmetric radial second air gap is formed between the two rotor parts, the magnetic flux across the second air gap being changed according to the difference angle between the rotor and the stator. This change is determined by a magnetically sensitive element which is arranged at a stationary position within the second air gap. There is no other magnetic flux from the rotor to the stator and back than the flux between the magnetic poles and the pole ends.

DE 198 16 598 A1 discloses a sensor for measuring difference angles between two parts rotating about a common axis. Here, both a rotor and a stator have a same number of pole ends. The pole ends of the rotor face the pole ends of the stator across a radial first air gap. A magnetic flux through the stator towards the rotor is provided by a radially magnetized permanent magnet. The magnetic flux through the rotor varies with the position of the pole ends of the rotor with regard to the pole ends of the stator, i.e. with the difference angle between the two parts. This variation is measured in a radially accessible and rotationally symmetric axial second air gap between the rotor and the stator by means of a magnetically sensitive element. However, the signal of the magnetically sensitive element does not indicate the direction of the difference angle here.

Thus, a simple but highly sensitive apparatus for contact-less measuring the value, inclusive of the direction, of a difference angle between two parts rotating about a common axis is still needed.

SUMMARY OF THE INVENTION

The invention provides an apparatus for contact-less measuring the value of a difference angle between two parts rotating about a common axis, the apparatus comprising an annular shaped stator attached to one of the two parts, the stator having a permanent magnetization on an inner circumference thereof forming of a number of at least two magnetic pole pairs, each pole pair consisting of two magnetic poles of opposite signs, and the signs of the magnetic poles of all pole pairs alternating in the direction of rotation about the common axis; a cylindrically shaped ferromagnetic rotor attached to the other of the two parts and positioned inside the stator, the rotor having a number of at least two pole ends for magnetically scanning the stator, the poles being successive in the direction of rotation about the common axis, and the number of the pole ends being the same as the number of the pole pairs of the stator; a first air gap between the pole pairs of the stator and the pole ends of the rotor, each pole end of the rotor facing one pole pair of the stator over the first air gap, all conditions of arrangement of all pole ends and the corresponding pole pairs being the same; an accessible and rotationally symmetric second air gap of continuous dimensions between the stator and the rotor, the magnetic flux across the second air gap being changed according to the difference angle between the rotor and the stator; and at least one magnetically sensitive element for determining the magnetic flux across the second air gap, the magnetically sensitive element being arranged at a fixed position in the second air gap and not being rotated with one of the two parts about the common axis.

In a preferred embodiment of the invention, the first air gap is a radial air gap, the permanent magnetization of the stator and the pole ends of the rotor having a radial orientation with regard to the common axis. Further, it is preferred that the second air gap also is a radial air gap. The second air gap may then be arranged at an axial position along the common axis of rotation differing from the position of the first air gap. The provision of only radial air gaps makes this embodiment of the invention particularly insensitive to axial play between the two parts in the direction of the common axis with regard to the signal of the magnetically sensitive element obtained for a certain difference angle.

In a further preferred embodiment of the invention, the second air gap is provided between a stator yoke and a rotor yoke.

In a further preferred embodiment of the invention, the stator consists of permanent magnets forming the pole pairs and a stator yoke, the stator yoke being continuous from the pole pairs up to the second air gap.

In a further preferred embodiment of the invention, the rotor consists of a rotor yoke, the rotor yoke forming the pole ends and being continuous up to the second air gap.

In a further preferred embodiment of the invention, the pole pairs of the stator are arranged at the same intervals in the direction of rotation about the common axis as the pole ends of the rotor, the magnetic poles of opposite signs of each pole pair being arranged directly side-by-side.

In a further preferred embodiment of the invention, the magnetic poles of the pole pairs of the stator have the same dimensions in the direction of rotation about the common axis as the pole ends of the rotor.

In a further preferred embodiment of the invention, the magnetically sensitive element transforms the magnetic flux across the second air gap into an electrical signal. To this end, the magnetically sensitive element comprises a Hall probe. In a further preferred embodiment of the invention for measuring torque between the two parts, a spring having a defined spring characteristic over the difference angle is arranged between the two parts, the spring transforming a certain torque between the two parts into a certain difference angle. The spring may be a mechanical spring. As an alternative, the spring may be a magnetic spring. In this alternative, the magnetic spring may make use of an intrinsic magnetic holding force between the pole ends of the rotor and the pole pairs of the stator.

In a further preferred embodiment of the invention, the stator and the rotor are encapsulated by a housing made of a material which is selected from the group consisting of paramagnetic and diamagnetic materials. This housing may not encapsulate the magnetically sensitive element. Instead, this element may be placed outside the housing.

In a further preferred embodiment of the invention, at least one further magnetically sensitive element is arranged at a fixed position adjacent the rotating pole pairs of the stator but not rotating with one of the two parts for determining the absolute rotational position of the stator by scanning the permanent magnetization of its pole pairs.

The main components of the present invention are the stator with the permanent radial magnetization, like for example a magnetized ferrite ring or a ferromagnetic ring to which permanent magnets are attached, and the ferromagnetic rotor, for example made of iron, forming the radially orientated pole ends for magnetically scanning the stator. Between the stator and the rotor there is the axially accessible, rotationally symmetric second air gap in which the magnetic flux changes according to the difference angle between the rotor and the stator. This change is detected by means of the magnetically sensitive element. At the stator there are pole pairs of magnetic poles of opposite sign, the signs of the magnetic poles of the pole pairs alternating in the direction of the difference angle between the rotor and the stator. Each pole end of the rotor is arranged underneath a magnetic pole pair of the stator in a same way. In a starting position, each pole end preferably is in a neutral position in the middle underneath the bordering between the two magnetic poles of opposite signs of one pole pair. A rotation of the rotor with regard to the stator results in the same change of the magnetic flux at all pole ends. This change also influences the flux at each point of the remaining magnetic circuit through the rotor and back to the stator. The rotor and the stator form the additional rotationally symmetric second radial air gap across which this flux is guided. Thus, the magnetic flux across the second air gap corresponds to a certain difference angle between the rotor and the stator. Because of the rotational symmetry of the gap this magnetic flux is, however, independent of the rotational position or motion of the whole arrangement about the common axis. In contrast to an electrical machine in which the total of the pole flux should have an average of zero, a total flux dependent on the difference angle between the stator and the rotor and running from the rotor yoke, across the second air gap and back to the stator yoke is enhanced and used here.

By a variation of the number of poles, the desired output signal for a given difference angle can be selected within a big range; also, by changing the form of the pole ends the curve of the output-signal of the magnetically sensitive element over the difference angle can be modified. Because of the compact and efficient magnetic circuit of the present invention a small number of pole pairs and pole ends is sufficient to achieve a high sensitivity with regard to the difference angle. As both the rotor and the stator may be freely rotated, there is a very big range of applications of the present invention. In case of large differences in the rotational speed of the rotor and the stator, however, eddy current losses are to be considered. If necessary, the rotor may be laminated.

The magnetically sensitive element arranged in the second air gap preferably enables a transformation of the magnetic flux into an electrical signal which is often necessary for an automated evaluation. The magnetically sensitive element, e.g. a Hall sensor or a field plate, is stationarily arranged in such a way that the active area of this element is within the second air gap. In case of a sufficient size of the second air gap the measurement signal shows nearly no dependency on small axial and radial tolerances and vibrations between the two parts. Because of the high sensitivity of the apparatus according to the invention, large signal amplitudes can be obtained even in case of small difference angles. These large amplitudes ensure a simple evaluation without the need of signal stabilization, signal offset correction, compensations, or the like.

If a mechanical or magnetic spring between the stator and the rotor transfers torques into rotational angles, the new arrangement enables the measurement of torques by means of measuring the difference angle between the two rotating parts. As a magnetic spring, the magnetic holding momentum (locking momentum) of the stator/rotor arrangement itself may be sufficient. In any case the spring characteristic of the forces between the stator and the rotor determine the ratio between the difference angle and the torque. An overload of a mechanical spring can be noted by too high amplitudes of the magnetic flux in the second air gap; over winding of a magnetic spring can be determined by the occurrence of an alternating flux in the second air gap. In the embodiments of the invention having no mechanical spring the functions of a reversible overload safety and of a torque determination are combined in an optimum way.

In a further advantageous embodiment of the invention the space between the rotor and the stator except for the air gaps is filled with an elastomeric material so that a closed, very compact vibration dampening unit is created which is suitable for a direct measurement of torque.

By means of para- or diamagnetically enclosing the arrangement of the stator and the rotor, the invention can also be used under difficult environmental conditions. For example, an enclosure can be provided by means of a housing in which lubricants are present. The housing can be designed in such a way that the second air gap is accessible for the magnetically sensitive element sensors through the wall of the housing. For example, if the housing is made of aluminum or plastics an opening in the housing is not necessary for the required access to the second air gap.

Further, the new arrangement provides the advantageous possibility of using the stator for an additional measurement of absolute rotational variables. The absolute rotational variables may be directly detected by a sensor sensing the rotating magnetic field of the rotating stator. Thus, for example, a precise determination of both the absolute rotational angle and the power-take-off torque, for example, are possible in a simple way.

The terms rotor and stator are only used for the reason of definition here. They are not intended to be limiting as such. Generally, the details of the rotor and the stator are free as in electrical machines.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 6 is an axial view showing the embodiment of the apparatus of the invention comprising the rotor according to FIGS. 1 to 3 and the stator according to FIGS. 4 and 5 in a neutral rotational position.

FIG. 7 is a radial sectional view of the apparatus of FIG. 6 additionally showing a Hall sensor.

FIG. 8 is an axial view of the apparatus of FIG. 6 in another rotational position.

FIG. 9 is a radial partly sectional view showing a concrete application example of the apparatus of the invention, i.e. a torque determination for an electric power-assisted steering.

DETAILED DESCRIPTION

Figure 3:
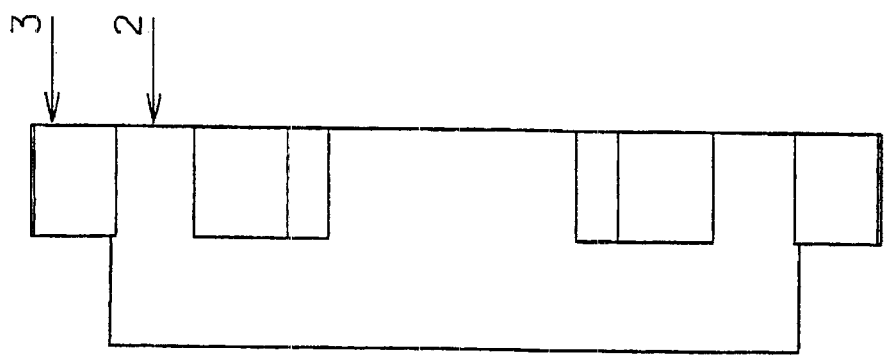
FIG. 3 is a radial view of the rotor of FIGS. 1 and 2.
Figure 2:
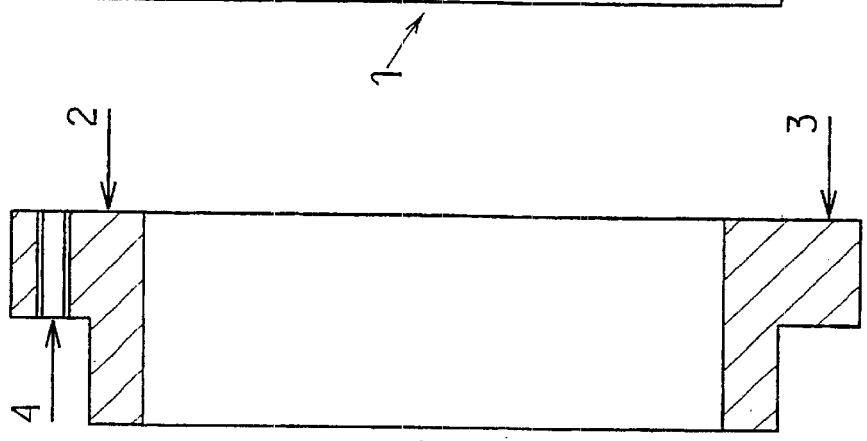
FIG. 2 is a radial sectional view of the rotor of FIG. 1.
Figure 1:
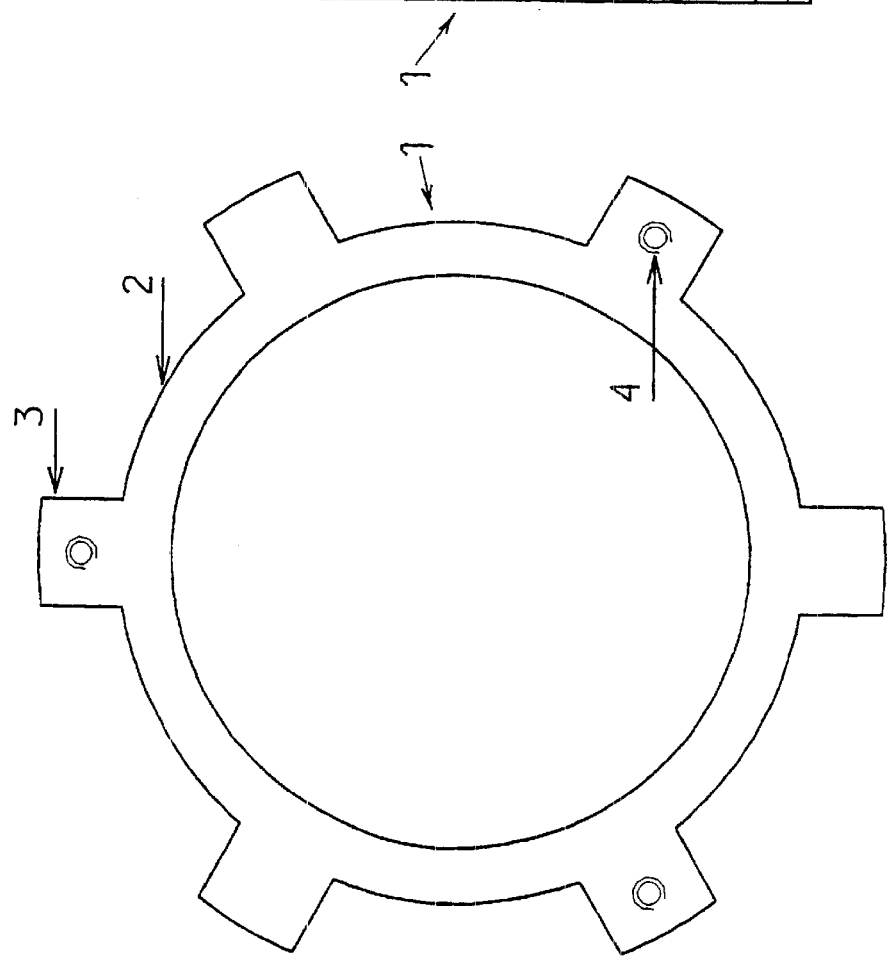
FIG. 1 is an axial view of a rotor of a first embodiment of the apparatus of the invention.

Referring now in greater detail to the drawings, FIGS. 1 to 3 illustrate a rotor 1 of a typical embodiment of the invention. In the present, preferred embodiment, the rotor 1 is one part. It consists of a yoke 2 of a suitable form including pole ends 3. The number of pole ends 3 is six here. Holes 4 are indicated as one example of a possible attachment of the rotor 1. The hollow yoke 2 of the rotor 1 has advantages. However, the rotor can also be designed with a smaller diameter or with a massive shaft.

Figure 5:
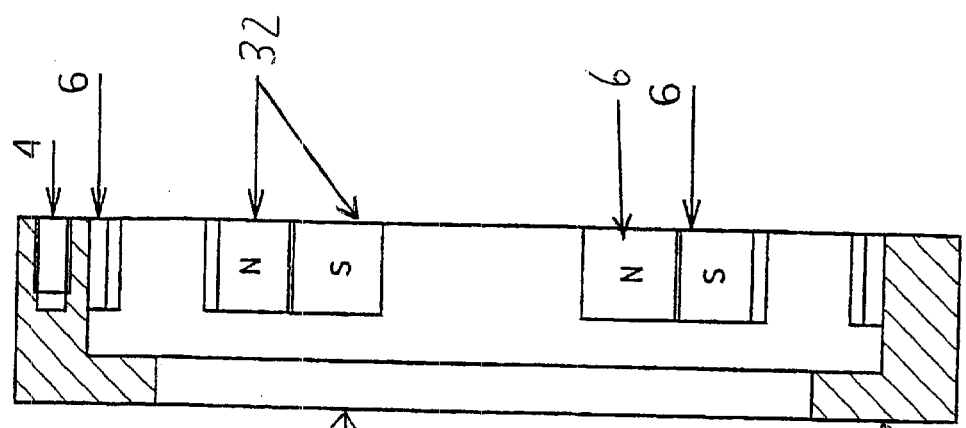
FIG. 5 is a radial sectional view of the stator of FIG. 4.
Figure 4:
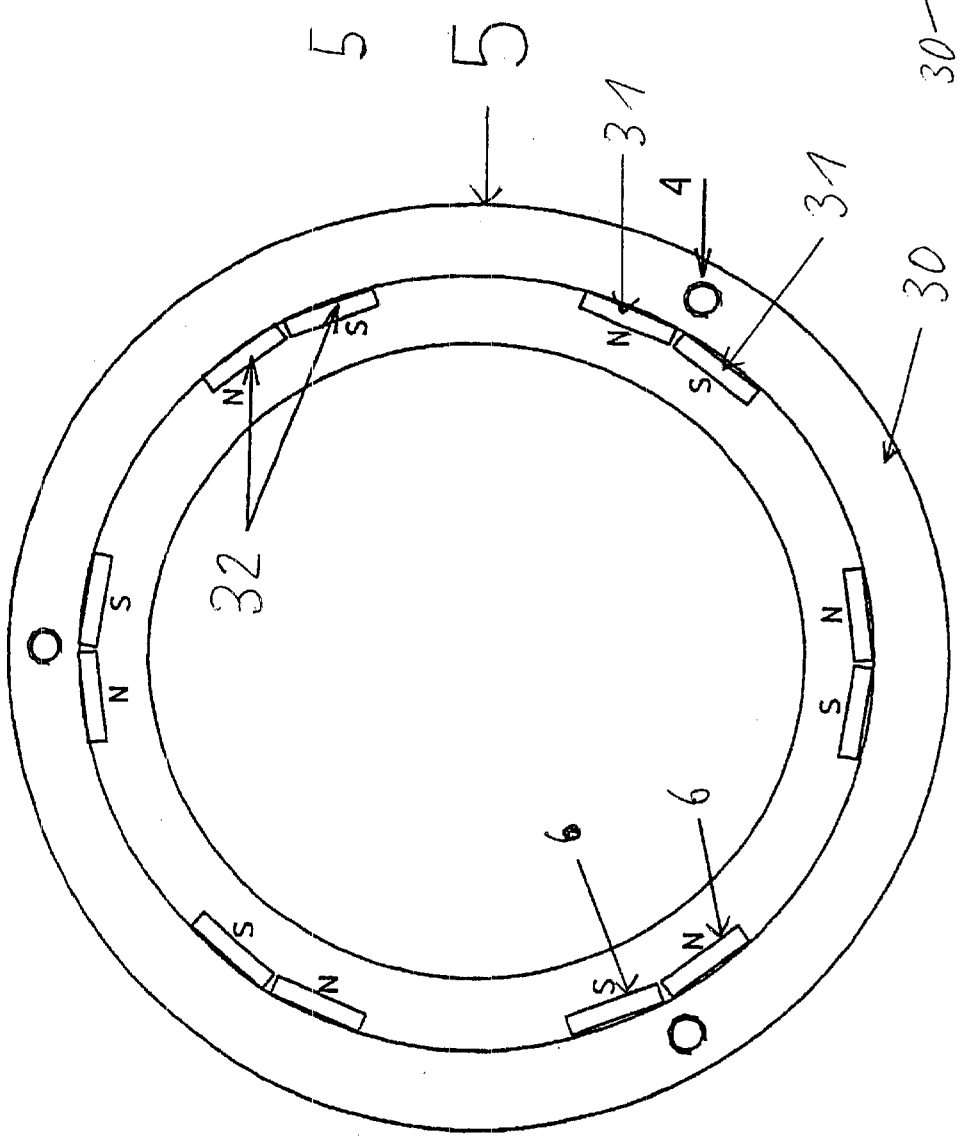
FIG. 4 is an axial view of a stator of the first embodiment of the apparatus of the invention.

FIGS. 4 and 5 illustrate a stator 5 of a typical embodiment of the invention. The stator 5 consists either of a ring shaped yoke 30 provided with permanent magnets 31, or totally of a material with a high magnetic remanence, like for example a ferrite ring, which is magnetized in a defined way. In either case, magnetic poles 6 are provided at the stator 5 which are successive with alternating signs, N and S, in a tangential direction and which are forming pole pairs 32 of two magnetic poles 6 of opposite signs, N and S. The number of pole pairs 32 is equal to the number of pole ends 3 of the rotor 1. Holes 4 are indicated as one example of a possible means of attachment of the stator 5.

In the neutral position of the assembled apparatus which is shown in FIGS. 6 and 7 the pole ends 3 of the rotor 1 are aligned with borderings of the magnetic poles 6 of the pole pairs 32 of the stator 5 so that the resulting magnetic flux in the yoke 2 and thus in an air gap 7 provided between the yoke 2 of the rotor 1 and the yoke 30 of the stator 5 is zero. The effect of the north and south poles 6 of each pole pair 32 of the stator is reduced to a neutralization of the opposite portions of the flux at the surface of the pole ends 3.

FIG. 8 shows a position of the apparatus of FIGS. 6 and 7 in which the rotor 1 has been rotated with regard to the stator 5 about a common axis 34 of rotation. It can be seen that the excursed pole ends 3 are asymmetrically covered by the magnetic poles 6 of opposite signs of each pole pair 32. Here, the pole ends 3 are to a larger extent covered by the north poles, N. As a result, there is a net magnetic flux through the pole ends 3, through the yoke 2 and across the air gap 7 back to the stator 5. A Hall sensor 8 stationarily arranged in the air gap 7 transforms this flux into an electrical signal. The dependency of the electrical signal of the difference angle shows a good linearity monotony, and is, thus, directly usable for most applications. In cases where highest precision is required, an additional conversion of the output signal using a calibration function or calibration table will provide the exact value of the difference angle between the rotor 1 and the stator 5. This principle of measuring the difference angle is independent of the rotational position of the rotor 1 and the stator 5 about the axis 34 with regard to the stationary Hall sensor 8 and even independent of a rotational movement of the rotor 1 and the stator 5 about the axis 34. Instead of the axially accessible radial air gap 7 which is depicted here, another embodiment of the invention may provide a corresponding axial air gap which is accessible in a radial direction.

The application example of the apparatus of the present invention shown in FIG. 9 is an electric power-assisted steering for a motor vehicle. Between a steering wheel 9 and a steering gear 10 there is a compact unit which comprises an electronically commutated direct drive motor 33 having a stator 12 and a rotor 11 and the apparatus of the invention having the rotor 1 and the stator 5. All components of the unit are enclosed by a common housing 16. The Hall sensor which is connected to a control unit (not depicted) is suitably supported at the housing 16 within the air gap 7 but outside of lubricants which may be provided within the housing 16. A spring element 14 is arranged between the power take-in formed by the rotor 1 connected to the steering wheel 9 and the power take-off formed by the stator 5 connected to the rotor 11 of the direct drive motor 33. The spring element 14 is twisted, if loaded with a torque, and thus provides a rotational angle between the rotor 1 and the stator 5 which directly corresponds to the actual torque. A torque applied by a driver to the steering wheel 9 is thus measured by the apparatus according to the invention, the Hall sensor 8 providing an electrical signal indicative of the present torque. A second Hall sensor 15 which scans the permanent magnetization of the stator 1 at another stationary position within the housing 16 provides the control unit with a second electrical signal indicative of the absolute rotational position of the stator 1, i.e. of the steering wheel 9. Thus, all necessary signals for actuating the direct drive motor 33 and for closing its control loop are provided as the stator 5 is fixedly connected to the power take-off and the rotor 11 of the direct drive motor. The stator 5 of the direct drive motor 33 is fixedly mounted in the housing 16. The control unit evaluates a force demand at the steering wheel in form of a signal from the Hall sensor 8 and actuates the direct drive motor 33 in a suitable manner so that the force to be applied to the steering wheel 9 is reduced in a desired way.

Figure 10:
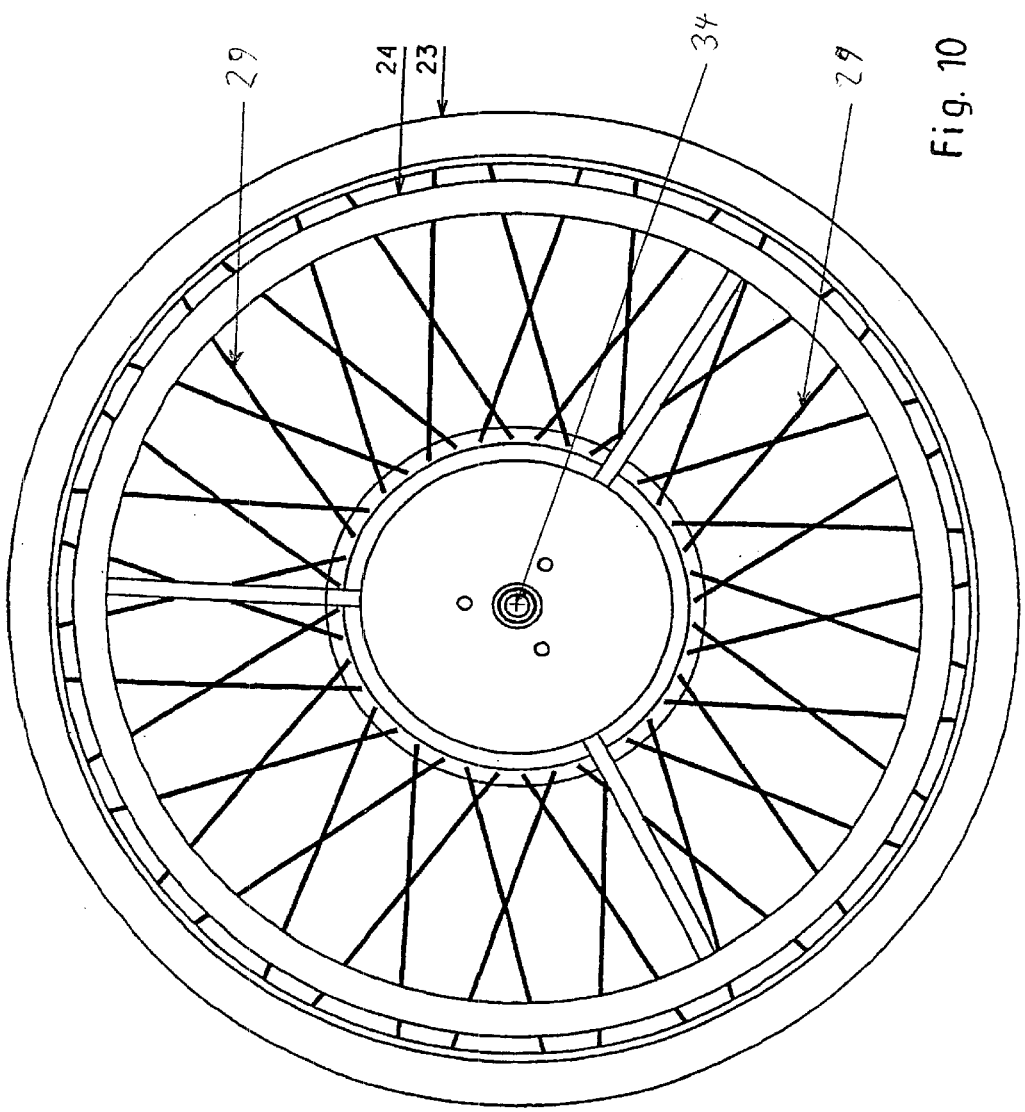
FIG. 10 is a axial view showing a further concrete application example of the apparatus of the invention in a wheelchair having an electrical direct drive with grip ring actuation.
Figure 11:
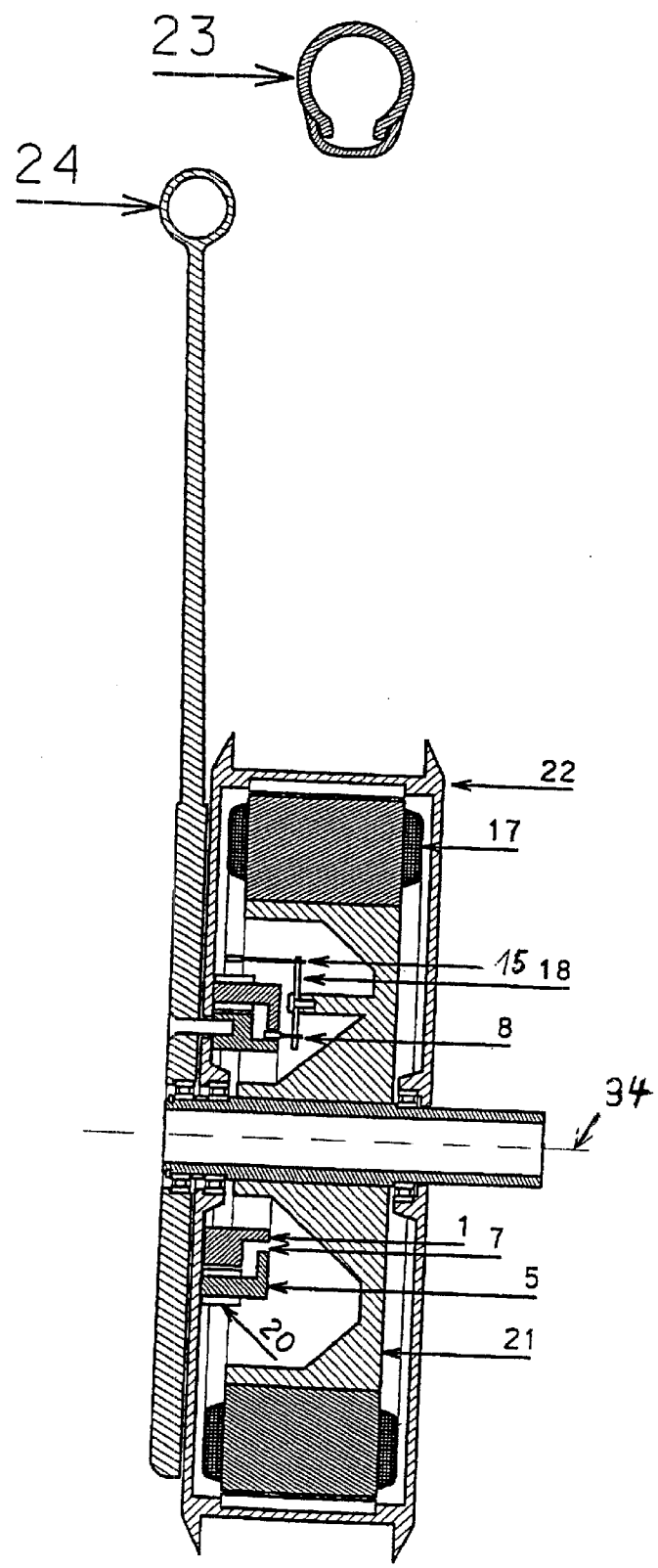
FIG. 11 is an enlarged radial sectional view of a detail of FIG. 10.

FIGS. 10 and 11 show the realization of an absolute rotational angle measurement for actuating a drive wheel 23 of an electric wheelchair combined with an independent detection of an actuation force applied to a grip ring 24 mounted to the drive wheel 23 as a further exemplary application of the invention. The drive wheel 23 is connected to a motor housing 22 by spokes 29. The grip ring 24 can be rotated to a little extent with regard to the drive wheel 23 out of a neutral position against the force of a spring which is not depicted here. This rotation is directly transferred onto the rotor 1 which is fixedly connected to the grip ring 24, whereas the stator 5 is directly connected to the motor housing 22. For controlling an electronically commutated motor 17, which is included in the wheel, commutation signals are necessary which are provided by the Hall sensor 15 and which may also be used for precisely controlling the driving motion, i.e. direction, of the wheelchair. To this end, the Hall sensor 15 measures the absolute wheel or rotor position of the motor directly at the stator 5 which is here also provided with further permanent magnets 20 at its outer circumference to enhance the signal of the Hall sensor 15. In a simplified embodiment of the invention, the stator 5 could be formed by a ferrite ring which is itself radially magnetized. Scanning the pole pairs at the inner circumference of the stator 5 is effected by the pole ends of the rotor 1 for measuring the force applied to the grip ring 24. The evaluation of this scanning is effected by the Hall sensor 8 in the air gap 7. For reasons of simplicity, all Hall sensors 8 and 15 are arranged on a common printed circuit board 18 which is attached to a support at the motor base 21. If an actuation force is applied to the grip ring 24 by the driver of the wheel chair, this is signaled to the control unit by the Hall sensor 8, and the control unit sets free further drive power by actuating the motor 17. This reduces the forces to be applied to the grip ring 24 by the driver for moving the wheelchair.

Many variations and modifications may be made to the preferred embodiments of the invention without departing substantially from the spirit and principles of the invention. All such modifications and variations are intended to be included herein within the scope of the present invention, as defined by the following claims.

I claim:
1. An apparatus for contact-less measuring the value of a difference angle between two parts rotating about a common axis, the apparatus comprising:
an annular shaped stator attached to one of the two parts, the stator having a permanent magnetization on an inner circumference thereof forming of a number of at least two magnetic pole pairs, each pole pair consisting of two magnetic poles of opposite signs, and the signs of the magnetic poles of all pole pairs alternating in the direction of rotation about the common axis;
a cylindrically shaped ferromagnetic rotor attached to the other of the two parts and positioned inside the stator, the rotor having a number of at least two pole ends for magnetically scanning the stator, the poles being successive in the direction of rotation about the common axis, and the number of the pole ends being the same as the number of the pole pairs of the stator;
a first air gap between the pole pairs of the stator and the pole ends of the rotor, each pole end of the rotor facing one pole pair of the stator over the first air gap, all conditions of arrangement of all pole ends and the corresponding pole pairs being the same;
an accessible and rotationally symmetric second air gap of continuous dimensions between the inner circumference of the stator and the rotor, a magnetic flux across the second air gap being changed according to the difference angle between the rotor and the stator; and
at least one magnetically sensitive element for determining the magnetic flux across the second air gap, the magnetically sensitive element being arranged at a fixed position in the second air gap and not being rotated with one of the two parts about the common axis.

2. The apparatus of claim 1, wherein the first air gap is a radial air gap, the permanent magnetization of the stator and the pole ends of the rotor having a radial orientation with regard to the common axis.

3. The apparatus of claim 2, wherein the second air gap is a radial air gap.

4. The apparatus of claim 3, wherein the second air gap is arranged at an axial position along the common axis of rotation differing from the axial position of the the first air gap.

5. The apparatus of claim 1, wherein the second air gap is provided between a stator yoke and a rotor yoke.

6. The apparatus of claim 5, wherein the stator further consists of permanent magnets forming the pole pairs and the stator yoke, the stator yoke being continuous from the pole pairs up to the second air gap.

7. The apparatus of claim 5, wherein the rotor further consists of the rotor yoke, the rotor yoke forming the pole ends and being continuous up to the second air gap.

8. The apparatus of claim 1, wherein the pole pairs of the stator are arranged at the same intervals in the direction of rotation about the common axis as the pole ends of the rotor, the magnetic poles of opposite signs of each pole pair being arranged directly side-by-side.

9. The apparatus of claim 1, wherein the magnetic poles of the pole pairs of the stator have the same dimensions in the direction of rotation about the common axis as the pole ends of the rotor.

10. The apparatus of claim 1, wherein the magnetically sensitive element transforms the magnetic flux across the second air gap into an electrical signal.

11. The apparatus of claim 10, wherein the magnetically sensitive element is a Hall probe.

12. The apparatus of claim 1, wherein a spring having a defined spring characteristic over the difference angle is arranged between the two parts, the spring transforming a certain torque between the two parts into a certain difference angle.

13. The apparatus of claim 12, wherein the spring is a mechanical spring.

14. The apparatus of claim 12, wherein the spring is a magnetic spring.

15. The apparatus of claim 14, wherein the magnetic spring makes use of an intrinsic magnetic holding force between the pole ends of the rotor and the pole pairs of the stator.

16. The apparatus of claim 1, wherein the stator and the rotor are encapsulated by a housing made of a material which is selected from the group consisting of paramagnetic and diamagnetic materials.

17. The apparatus of claim 1, wherein at least one further magnetically sensitive element is arranged at a fixed position adjacent the rotating pole pairs of the stator but not rotating with one of the two parts for determining the absolute rotational position of the stator by scanning the permanent magnetization of its pole pairs.

* * * * *